United States Patent
Tran

(10) Patent No.: US 10,536,327 B2
(45) Date of Patent: Jan. 14, 2020

(54) PROVIDING A LANDSCAPE AND STATISTICS SERVICE TO A MOBILE COMMUNICATIONS DEVICE

(71) Applicant: SAP SE, Walldorf (DE)

(72) Inventor: Duong-Han Tran, Bad Schoenborn (DE)

(73) Assignee: SAP SE, Walldorf (DE)

( * ) Notice: Subject to any disclaimer, the term of this patent is extended or adjusted under 35 U.S.C. 154(b) by 433 days.

(21) Appl. No.: 14/971,631

(22) Filed: Dec. 16, 2015

(65) Prior Publication Data
US 2017/0180215 A1    Jun. 22, 2017

(51) Int. Cl.
*H04L 12/24*    (2006.01)

(52) U.S. Cl.
CPC .................. *H04L 41/069* (2013.01)

(58) Field of Classification Search
CPC ... H04L 41/20; H04L 67/2823; H04L 41/142; H04L 41/069; H04L 67/2895; G06F 9/5061; G06F 15/16; G06F 9/00
See application file for complete search history.

(56) References Cited

U.S. PATENT DOCUMENTS

| | | | |
|---|---|---|---|
| 7,849,445 B2 | 12/2010 | Tran | |
| 8,180,845 B2 | 5/2012 | Brendle et al. | |
| 8,881,108 B2 | 11/2014 | Tran | |
| 8,954,602 B2 | 2/2015 | Seifert et al. | |
| 9,146,802 B2 | 9/2015 | Tran et al. | |
| 2005/0138113 A1* | 6/2005 | Brendle | H04L 29/06 709/203 |
| 2008/0141341 A1* | 6/2008 | Vinogradov | G06F 21/6218 726/2 |
| 2009/0125496 A1* | 5/2009 | Wexler | G06F 16/24553 |
| 2012/0197963 A1* | 8/2012 | Bouw | G06F 16/258 709/202 |
| 2012/0218902 A1* | 8/2012 | Kirtley | H04L 41/08 370/241 |
| 2012/0246202 A1* | 9/2012 | Surtani | G06F 16/289 707/812 |
| 2013/0159468 A1* | 6/2013 | Kusterer | H04L 67/2823 709/219 |

(Continued)

OTHER PUBLICATIONS

Common Object Request Broker Architecture; Wikipedia.*

(Continued)

*Primary Examiner* — Vivek Srivastava
*Assistant Examiner* — Muhammad Raza
(74) *Attorney, Agent, or Firm* — Fish & Richardson P.C.

(57) ABSTRACT

Techniques for establishing a communication connection between a hub computing system and a back-end computing system; receiving, at the hub computing system and from an Open Data Protocol (OData) application that resides on a mobile communications device, a request for a landscape and statistics service providing information associated with the back-end computing system; registering, on the hub computing system, the landscape and statistics service as an OData service configured to be provided over an OData channel between the hub computing system and the mobile communications device; and providing, by the hub computing system, the landscape and statistics service to the OData application as the OData service over the OData channel.

9 Claims, 7 Drawing Sheets

(56) References Cited

U.S. PATENT DOCUMENTS

| | | | | |
|---|---|---|---|---|
| 2013/0159484 | A1* | 6/2013 | S | G06F 8/30 |
| | | | | 709/223 |
| 2013/0326079 | A1 | 12/2013 | Seifert et al. | |
| 2013/0326087 | A1 | 12/2013 | Storz et al. | |
| 2014/0047342 | A1* | 2/2014 | Breternitz | G06F 9/5061 |
| | | | | 715/735 |
| 2015/0067494 | A1* | 3/2015 | Hattori | G06F 17/212 |
| | | | | 715/274 |
| 2015/0278245 | A1* | 10/2015 | Sagar | G06F 17/30174 |
| | | | | 707/610 |
| 2017/0124084 | A1* | 5/2017 | Borghetti | G06F 11/302 |

OTHER PUBLICATIONS

Data Distribution Service; Wikipedia.*
IDL specification language; Wikipedia.*
Interface description language; Wikipedia.*
Language-independent specification; Wikipedia.*
Remote procedure call; Wikipedia.*

* cited by examiner

PROVIDING A LANDSCAPE AND STATISTICS SERVICE TO A MOBILE COMMUNICATIONS DEVICE

BACKGROUND

This disclosure relates to providing a landscape and statistics service to a mobile communications device and, more particularly, providing a landscape and statistics service as an OData service to a mobile communications device.

SUMMARY

The present disclosure relates to computer-implemented methods, software, and systems for providing a landscape and statistics service to a mobile communications device. In some implementations, a communication connection is established between a hub computing system and a back-end computing system. A request for a landscape and statistics service providing information associated with the back-end computing system is received. In some examples, the request is received at the hub computing system and from an Open Data Protocol (OData) application that resides on the mobile communications device. The landscape and statistics service is registered on the hub computing system as an OData service configured to be provided over an OData channel between the hub computing system and the mobile communications device. The landscape and statistics service is provided by the hub computing systems to the OData application as the OData service over the OData channel.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

In a first aspect combinable with any of the general implementations, the landscape and statistics service further provides information associated with the hub computing system.

In a second aspect combinable with any of the previous aspects, the information associated with the hub computing system and the back-end computing system includes release information associated with the hub computing system and the back-end computing system.

In a third aspect combinable with any of the previous aspects, the information associated with the hub computing system and the back-end computing system includes statistics information associated with the hub computing system and the back-end computing system, the statistics information including single request statistics, a summary of selected single request statistics, and aggregated statistics.

In a fourth aspect combinable with any of the previous aspects, the statistics information includes a time duration associated with each of the hub computing system and the back-end computing system with respect to the OData service.

In a fifth aspect combinable with any of the previous aspects, further including storing the information associated with the back-end computing system in a database of the hub computing system.

In a sixth aspect combinable with any of the previous aspects, further including identifying an authorization of the OData application residing on the mobile communications device to receive the landscape and statistics service as the OData service.

In a seventh aspect combinable with any of the previous aspects, the communication connection is established between the hub computing system and two or more back-end computing systems, and receiving the request further includes receiving a request for the landscape and statistics service providing information associated with the two or more back-end computing systems.

Various implementations of a computing system according to the present disclosure may have one or more of the following features. For example, analyzing performance of back-end computing systems remotely based on the determined durations of different software components involved in a request processing to locate some performance problem or to decide which components should be analyzed in detail to improve the performance. Another example is to determine the landscape of the back-end computing systems remotely. In error cases, the landscape information will help the system administrators to find out which computing system is affected. Other features will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Figure 1:
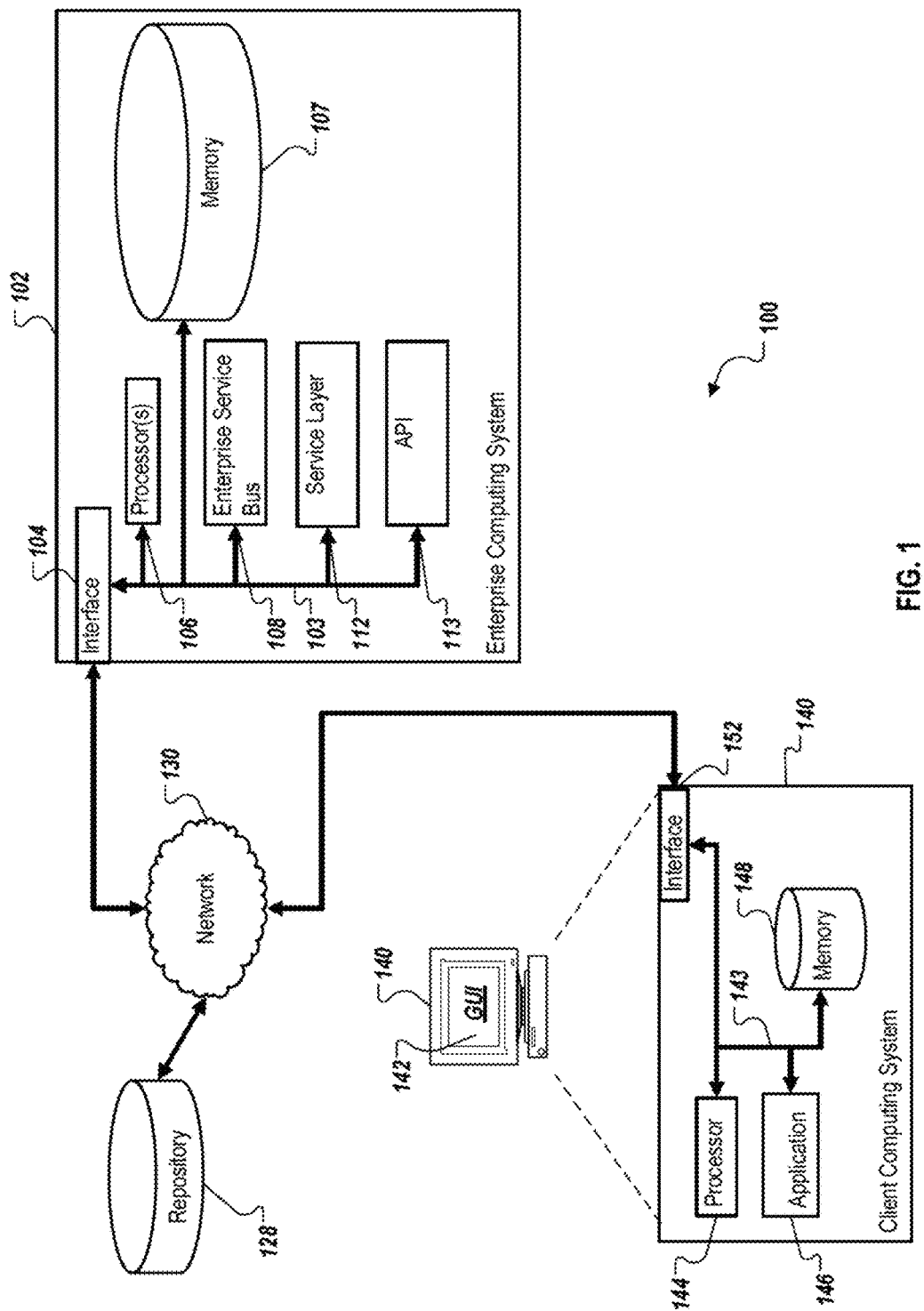
FIG. 1 illustrates an example distributed computing system, according to an implementation.

FIG. 1 illustrates an example distributed computing system 100, according to an implementation. The illustrated example distributed computing system 100 includes an enterprise computing system 102, a client computing system 140, and a repository 128 communicating using a network 130. In some examples, the illustrated enterprise server computing system 102 may store a plurality of various hosted applications, while in some examples, the enterprise server computing system 102 may be a dedicated server meant to store and execute only a single hosted application. In some instances, the enterprise server computing system 102 may comprise a web server, where the hosted applications represent one or more web-based applications accessed and executed using the network 130 by the client computing system 140 to perform the programmed tasks or operations of the hosted application.

At a high level, the illustrated enterprise server computing system 102 comprises an electronic computing device operable to receive, transmit, process, store, or manage data and information associated with the distributed computing system 100. Specifically, the enterprise server computing system 102 illustrated in FIG. 1 is responsible for receiving application requests from one or more client applications associated with the client computing system 140 of the distributed computing system 100 and responding to the received requests by processing said requests in the associated hosted application, and sending the appropriate response from the hosted application back to the requesting client application. In addition to requests from the client computing system 140 illustrated in FIG. 1, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device, components of which communicate using a computing system bus (e.g., such as computing system bus 103 illustrated in the enterprise server computing system 102). For example, although FIG. 1 illustrates a single enterprise server computing system 102, the distributed computing system 100 can be implemented using two or more servers, as well as computers other than servers, including a server pool. In some examples, the enterprise server computing system 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the enterprise server computing system 102 may be adapted to execute any operating system, including Linux, UNIX, Windows, Mac OS, or any other suitable operating system.

The illustrated enterprise server computing system 102 further includes an interface 104. Although illustrated as a single interface 104 in FIG. 1, two or more interfaces 104 may be used according to particular needs, desires, or particular implementations of the example distributed computing system 100. The interface 104 is used by the enterprise server computing system 102 for communicating with other systems in a distributed environment—including within the example distributed computing system 100—connected to the network 130; for example, the client computing system 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, ABAP, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The illustrated enterprise server computing system 102 further includes a processor 106. Although illustrated as a single processor 106 in FIG. 1, two or more processors may be used according to particular needs, desires, or particular implementations of the example distributed computing system 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the enterprise server computing system 102. Specifically, the processor 106 executes the functionality required to receive and respond to requests from the client computing system 140.

The illustrated enterprise server computing system 102 also includes a memory 107. Although illustrated as a single memory 107 in FIG. 1, two or more memories may be used according to particular needs, desires, or particular implementations of the example distributed computing system 100. In some implementations, the memory 107 is an in-memory database. While memory 107 is illustrated as an integral component of the enterprise server computing system 102, in some implementations, the memory 107 can be external to the enterprise server computing system 102 and/or the example distributed computing system 100. The memory 107 may include any memory or database module and may take the form of volatile or non-volatile memory including, without limitation, magnetic media, optical media, random access memory (RAM), read-only memory (ROM), removable media, or any other suitable local or remote memory component. The memory 107 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise computing system 102. Additionally, the memory 107 may include any other appropriate data, such as VPN applications, firmware logs and policies, firewall policies, a security or access log, print or other reporting files, as well as others.

The illustrated enterprise server computing system 102 further includes a service layer 112. The service layer 112 provides software services to the example distributed computing system 100. The functionality of the enterprise server computing system 102 may be accessible for all service consumers using this service layer. For example, in one implementation, the client computing system 140 can utilize the service layer 112 to communicate with the design engine 118. Software services provide reusable, defined business functionalities through a defined interface. For example, the interface may be software written in extensible markup language (XML) or other suitable language. While illustrated as an integrated component of the enterprise server computing system 102 in the example distributed computing system 100, alternative implementations may illustrate the service layer 112 as a stand-alone component in relation to other components of the example distributed computing system 100. Moreover, any or all parts of the service layer 112 may be implemented as child or sub-modules of another software module, enterprise application, or hardware module without departing from the scope of this disclosure.

The illustrated enterprise server computing system 102 further includes an application programming interface (API) 113. In some implementations, the API 113 can be used to interface between the design engine 118 and one or more components of the enterprise server computing system 102 or other components of the example distributed computing system 100, both hardware and software. For example, in some implementations, the design engine 118 can utilize the API 113 to communicate with the client computing system 140. The API 113 may include specifications for routines, data structures, and object classes. The API 113 may be either computer language independent or dependent and refer to a complete interface, a single function, or even a set of APIs. While illustrated as an integrated component of the enterprise server computing system 102 in the example distributed computing system 100, alternative implementations may illustrate the API 113 as a stand-alone component in relation to other components of the example distributed computing system 100. Moreover, any or all parts of the API 113 may be implemented as child or sub-modules of another software module, enterprise application, or hardware module without departing from the scope of this disclosure.

The client computing system 140 may be any computing device operable to connect to or communicate with at least the enterprise server computing system 102 using the network 130. In general, the client computing system 140 comprises a computer operable to receive, transmit, process, and store any appropriate data associated with the example distributed computing system 100. The illustrated client computing system 140 further includes an application 146. The application 146 is any type of application that allows the client computing system 140 to request and view content on the client computing system 140. In some implementations, the application 146 can be and/or include a web browser. In some implementations, the application 146 can use parameters, metadata, and other information received at launch to access a particular set of data from the enterprise server computing system 102. Once a particular application 146 is launched, a user may interactively process a task, event, or other information associated with the enterprise server computing system 102. Further, although illustrated as a single application 146, the application 146 may be implemented as multiple applications in the client computing system 140.

The illustrated client computing system 140 further includes an interface 152, a processor 144, and a memory 148 communicating over a computing system bus 143. The interface 152 is used by the client computing system 140 for communicating with other systems in a distributed environment—including within the example distributed computing system 100—connected to the network 130; for example, the enterprise server computing system 102 as well as other systems communicably coupled to the network 130 (not illustrated). The interface 152 may also be consistent with the above-described interface 104 of the enterprise server computing system 102 or other interfaces within the example distributed computing system 100.

The processor 144 may be consistent with the above-described processor 106 of the enterprise server computing system 102 or other processors within the example distributed computing system 100. Specifically, the processor 144 executes instructions and manipulates data to perform the operations of the client computing system 140, including the functionality required to send requests to the enterprise server computing system 102 and to receive and process responses from the enterprise server computing system 102. The memory 148 may be consistent with the above-described memory 107 of the enterprise server computing system 102 or other memories within the example distributed computing system 100 but storing objects and/or data associated with the purposes of the client computing system 140.

Further, the illustrated client computing system 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the enterprise server computing system 102. Generally, through the GUI 142, an enterprise server computing system 102 user is provided with an efficient and user-friendly presentation of data provided by or communicated within the example distributed computing system 100.

There may be any number of client computing systems 140 associated with, or external to, the example distributed computing system 100. For example, while the illustrated example distributed computing system 100 includes one client computing system 140 communicably coupled to the enterprise server computing system 102 using network 130, alternative implementations of the example distributed computing system 100 may include any number of client computing systems 140 suitable for the purposes of the example distributed computing system 100. Additionally, there may also be one or more client computing systems 140 external to the illustrated portion of the example distributed computing system 100 that are capable of interacting with the example distributed computing system 100 using the network 130. Moreover, while the client computing system 140 is described in terms of being used by a single user, this disclosure contemplates that many users may use one computer, or that one user may use multiple computers.

The illustrated client computing system 140 is intended to encompass any computing device such as a desktop computer, laptop/notebook computer, wireless data port, smart phone, personal data assistant (PDA), tablet computing device, one or more processors within these devices, or any other suitable processing device. For example, the client computing system 140 may comprise a computer that includes an input device, such as a keypad, touch screen, or other device that can accept user information, and an output device that conveys information associated with the operation of the enterprise server computing system 102 or the client computing system 140 itself, including digital data, visual information, or a GUI 142, as shown with respect to the client computing system 140.

The illustrated distributed computing system 100 further includes a repository 128. In some implementations, the repository 128 is an in-memory repository. In some examples, the in-memory repository may include integrated processing. In some examples, the in-memory repository may reside on top of a computational engine that facilitates fast manipulations on large amounts of data and/or replication of data. The repository 128 can be a cloud-based storage medium. For example, the repository 128 can be networked online storage where data is stored on virtualized pools of storage.

With respect to the network 130, generally, the illustrated network 130 facilitates wireless or wireline communications between the components of the distributed computing system 100 (e.g., between the computing systems 102 and 140), as well as with any other local or remote computer, such as additional clients, servers, or other devices communicably coupled to network 130 but not illustrated in FIG. 1. The network 130 is illustrated as a single network in FIG. 1, but may be a continuous or discontinuous network without departing from the scope of this disclosure, so long as at least a portion of the network 130 may facilitate communications between senders and recipients. The network 130 may be all or a portion of an enterprise or secured network, while in another instance at least a portion of the network 130 may represent a connection to the Internet.

In some instances, a portion of the network 130 may be a virtual private network (VPN), such as, for example, the connection between the client computing system 140 and the enterprise server computing system 102. Further, all or a portion of the network 130 can comprise either a wireline or wireless link. Example wireless links may include 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated distributed computing system 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

Figure 2:
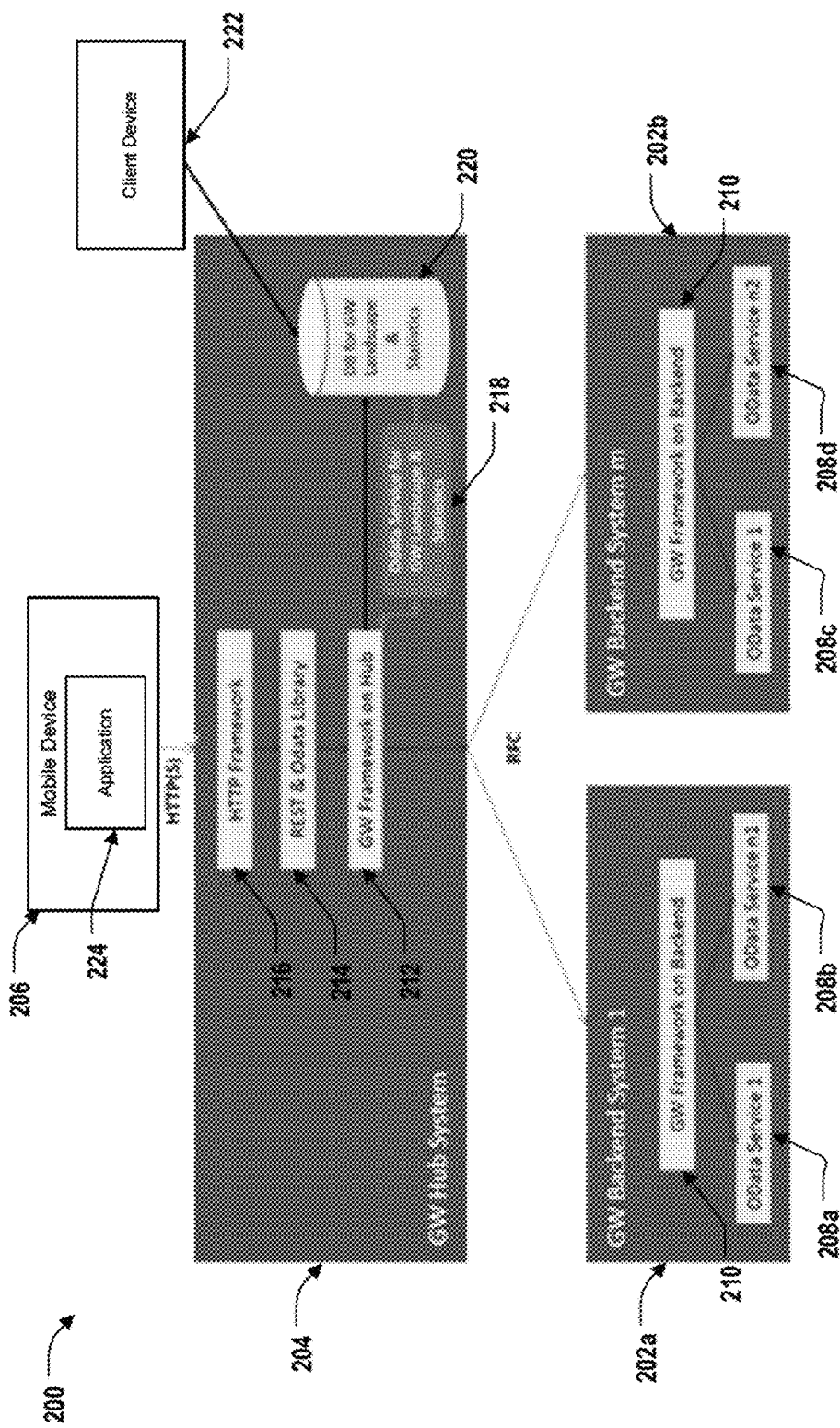
FIG. 2 illustrates a system for providing a landscape and statistics service for external consumption, according to an implementation.

FIG. 2 illustrates a system 200 for providing an OData service for external consumption, according to an implementation. The system 200 includes a first back-end computing system 202a, a second back-end computing system 202b (collectively referred to as back-end computing systems 202), a hub computing system 204, and a mobile communications device 206. For simplicity of illustration, the system 200 is shown including only a single mobile communications device 206. However, the system 200 can include any number of mobile communications devices. Additionally, the system 200 can be implemented by the enterprise computing system 102, the client computing system 140, or a combination thereof. For example, the back-end computing system 202 and the hub computing system 204 can be implemented by the enterprise computing system 102 and the mobile communications device 206 can be implemented by the client computing system 140.

Each of the back-end computing systems 202 is in communication with the hub computing system 204 (e.g., over the network 130). Each of the back-end computing systems 202 includes Open Data Protocol (OData) services 208 (illustrated as OData services 208a, 208b, 208c, 208d) and a gateway framework module 210. In some examples, OData is a data access protocol designed to provide standard CRUD (create, read, update, and delete) access to a data source (e.g., the back-end computing systems 202).

In general, the hub computing system 204 receives landscape and statistics service data associated with the OData services 208 and provides the same as an OData service over an OData channel between the hub computing system 204 and the mobile communications device 206. The hub computing system 204 is in communication with the back-end computing systems 202 and the mobile communications device 206. The hub computing system 204 includes a gateway framework module 212, a representational state transfer (REST) and OData library 214, and a hypertext transfer protocol (HTTP) framework module 216.

The hub computing system 204 further includes an OData service 218 and a database 220, each for landscape and statistics data. In general, the OData service 218 for landscape and statistics provides the landscape and statistics data from the database 220 for external consumption, e.g., by the mobile communications device 206, described further below. In some examples, the database 220 stores landscape and statistics data obtained from the OData services 208. In some examples, the system 200 further includes an internal client device 222 that can directly access the database 220. That is, the internal client device 222 is associated with a GUI that is able to display to facilitate analyzation of the landscape and statistics service data.

In general, the mobile communications device 206 receives the landscape and statistics service as an OData service over the OData channel between the mobile communication device 206 and the hub computing system 204. In some examples, receiving the landscape and statistics service includes receiving landscape and statistics information associated with the back-end computing systems 202 (e.g., the OData services 208). The mobile communications device 206 is in communication with the hub computing system 204. The mobile communications device 206 includes an OData application 224 (e.g., the OData application 224 resides on the mobile communications device 206). In some examples, the mobile communications device 206 includes a smartphone computing device, a tablet computing device, a phablet computing device, a personal digital assistant (PDA), or other mobile computing device operating a mobile operating system (e.g., an iOS-based, Android-based, Windows Mobile-based, BlackBerry, or Symbian-based mobile computing platform).

In some implementations, a connection is established by the hub computing system 204 with the back-end computing systems 202. Specifically, the gateway framework module 212 of the hub computing system 202 issues a remote function call (RFC) to each of the back-end computing systems 202, and particularly, to the gateway framework module 210 of each of the back-end computing systems 202. In some examples, by issuing the RFC to each of the back-end computing systems 202, the hub computing system 204 is able to communicate with each of the back-end computing systems 202, including exchange of data between the hub computing system 204 and each of the back-end computing systems 202.

Further, in some instances, the back-end computing systems 202 execute a first computer-implemented programming language, such as a propriety programming language or other high-level programming language, e.g., Advanced Business Application Programming (ABAP). Additionally, in some examples, the hub computing system 204 executes a second computer-implemented programming language, such as ABAP or Java. To that end, when the hub computing system 204 and the back-end computing systems 202 execute differing computer-implemented programming languages, by issuing the RFC by the hub computing system 202 to the back-end computing systems 202, the hub computing system 204 and the back-end computing systems 202 are able to communication and exchange data. In some examples, the hub computing system 204 establishes a connection with the back-end computing systems 202 in response to a request for the landscape and statistics service from the mobile communications device 206.

In some implementations, the hub computing system 204 receives a request for the OData service 218 for landscape and statistics from the OData application 224. In particular, the OData service 218 for landscape and statistics provides information associated with the back-end computing systems 202 (e.g., as stored by the database 220). Specifically, a user (e.g., a developer, administrator, support consultant, or end-user) associated with the mobile communications device 206 can initiate the request (e.g., using a graphical user interface (GUI)) for the OData service 218 for landscape and statistics utilizing the OData application 224. In response to the initiation of the request for the OData service 218 for landscape and statistics, the mobile communications device 206 provides the request to the hub computing system 204 over a network (e.g., the network 130) using a HTTP application protocol established between the hub computing system 204 and the mobile communications device 206. Specifically, the mobile communications device 206 provides the request to the HTTP framework module 216. The HTTP framework module 216 of the hub computing system 204 receives the request. In some examples, the mobile communications device 206 executes a computer-implemented processing language different from the computer-implemented language that the back-end computing systems 202 and/or the hub computing system 204 executes.

In some examples, the OData service 218 for landscape and statistics further provides information associated with the hub computing system 204. Specifically, the information can include release information of the hub computing system 204 and/or the back-end computing systems 202. The information can further include such system information as system ID, host name, and associated clients. In some examples, the information can include statistics information associated with the hub computing system 204 and/or the back-end computing systems 202, such as single request statistics, summary of single request statistics, and aggregated statistics, described further below. In some examples, the statistics information includes a time duration (or interval) associated with the hub computing system 204 and/or the back-end computing systems 202 with respect to the OData service.

In some implementations, the hub computing system 204 registers the OData service 218 for landscape and statistics as an OData service that can be provided over an OData channel between the hub computing system 204 and the mobile communications device 206. Specifically, registering can include converting a format of data of the landscape and statistics service (e.g., as stored by the database 220) such that the mobile communications device 206 and the OData application 224 are able to analyze and display the data (e.g., on a GUI of the mobile communications device 206). For example, the REST and OData library 214 can convert the format of the data (associated with the computer-implemented processing language of the back-end computing systems 202 and/or the computer-implemented processing language of the hub computing system 204) to a format that the mobile communications device 206 is able to utilize (e.g., an OData service). To that end, by registering the OData service 218, the OData service 218 is provided over an OData channel that is established (or that is previously established) between the hub computing system 204 and the mobile communications device 206.

In some implementations, the hub computing system 204 provides the OData service 218 for landscape and statistics to the OData application 224 as the OData service over the OData channel. Specifically, the hub computing system 204 provides (e.g., over the network 130) the landscape and statistics service data (using the OData service 218) in the format of an OData service to the OData application 224 of the mobile communications device 206. In some examples, the landscape and statistics service data is formatted for display on a GUI of the mobile communication device 206. For example, the landscape and statistics service data is formatted such that the GUI is able to appropriately display the landscape and statistics service data based on the dimensions of the GUI (e.g., a screen size of the mobile communications device 206 that includes the GUI).

In some examples, the mobile communications device 206 is authorized to receive the OData service 218 for landscape and statistics as the OData service. Specifically, the mobile communications device 206 is registered by the hub computing system 204 as a registered (e.g., approved) system for receiving the OData service 218 for landscape and statistics as the OData service. For example, the mobile communication device 206 can include a third-party device, and thus, to maintain the security (e.g., integrity) of the system 200, the mobile communications device 206 is registered with the hub computing system 204.

Figure 3:
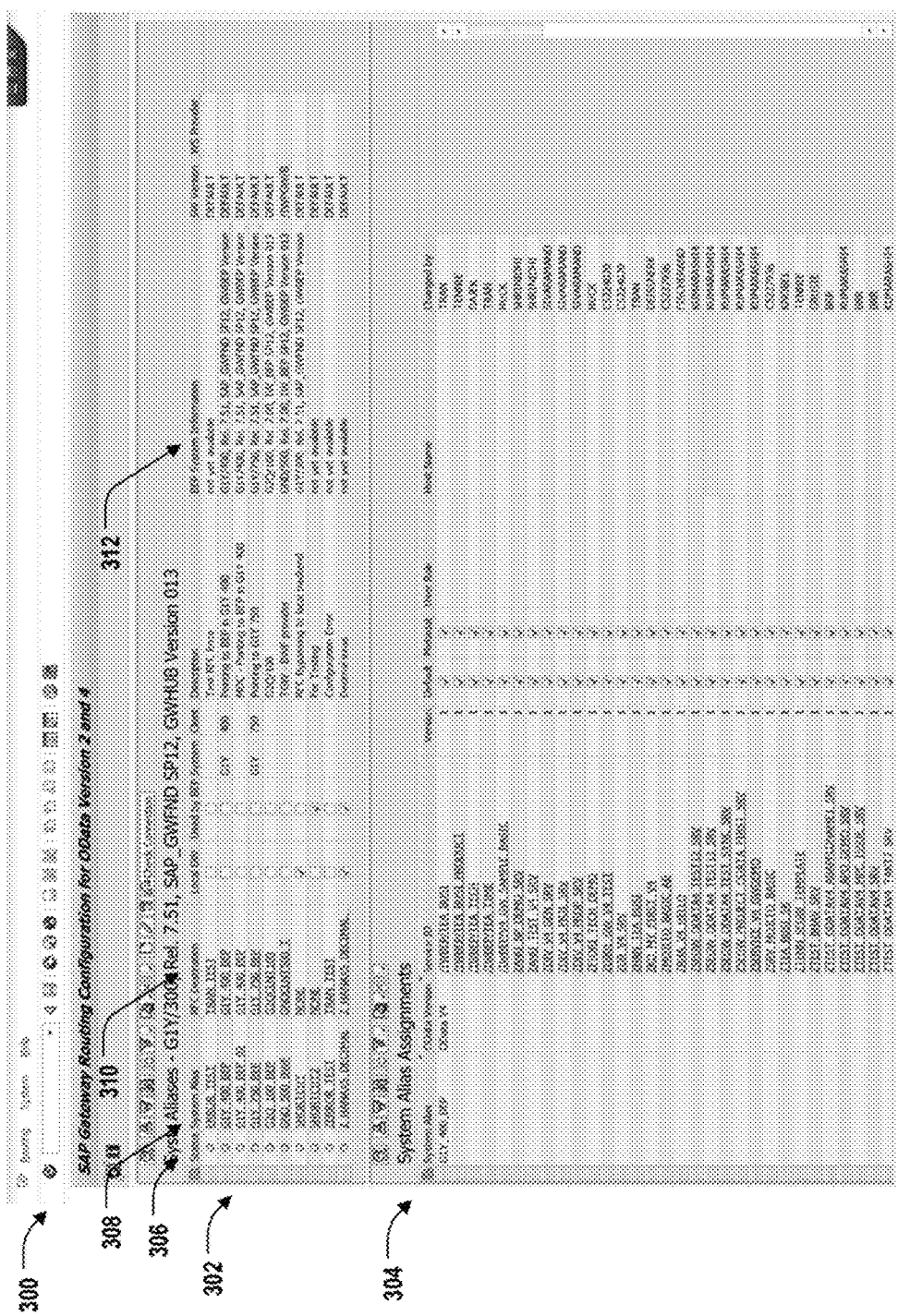
FIGS. 3-6 illustrate example graphical user interfaces for a display of a landscape and statistics service on a mobile communications device, according to an implementation.

FIG. 3 illustrates an example graphical user interface (GUI) 300 for display of the landscape and statistics service on a mobile communications device (e.g., a tablet computing device), according to an implementation. The GUI 300 includes a first portion 302 describing system release information of the hub computing system 204 and the back-end computing systems 202, including routing information to the back-end computing systems 202. Specifically, the first portion 302 includes a status column 306 displaying the communication stays between the hub computing system 204 and the back-end computing systems 202. For example, a green-colored status can indicate an "OK" status, and a red-colored status can indicate an "Error" status. The first portion 302 further includes a system alias column 308 and a RFC destination column 310 that display the configuration for the communication between the hub computing system 204 and the back-end computing systems 202. The first portion 302 further includes a BEP system information column 312 that displays the system release information of the back-end computing systems 202.

The second portion 304 describes all OData services for a particular selected system alias (e.g., one of the back-end computing systems 202). That is, the selected "System Alias" in the first portion 302. Specifically, the second portion 304 includes a service ID column 314 that displays all OData services for the selected system alias. The second portion 304 further includes an OData version column 316 that displays which OData version is supported by these services.

Figure 4:
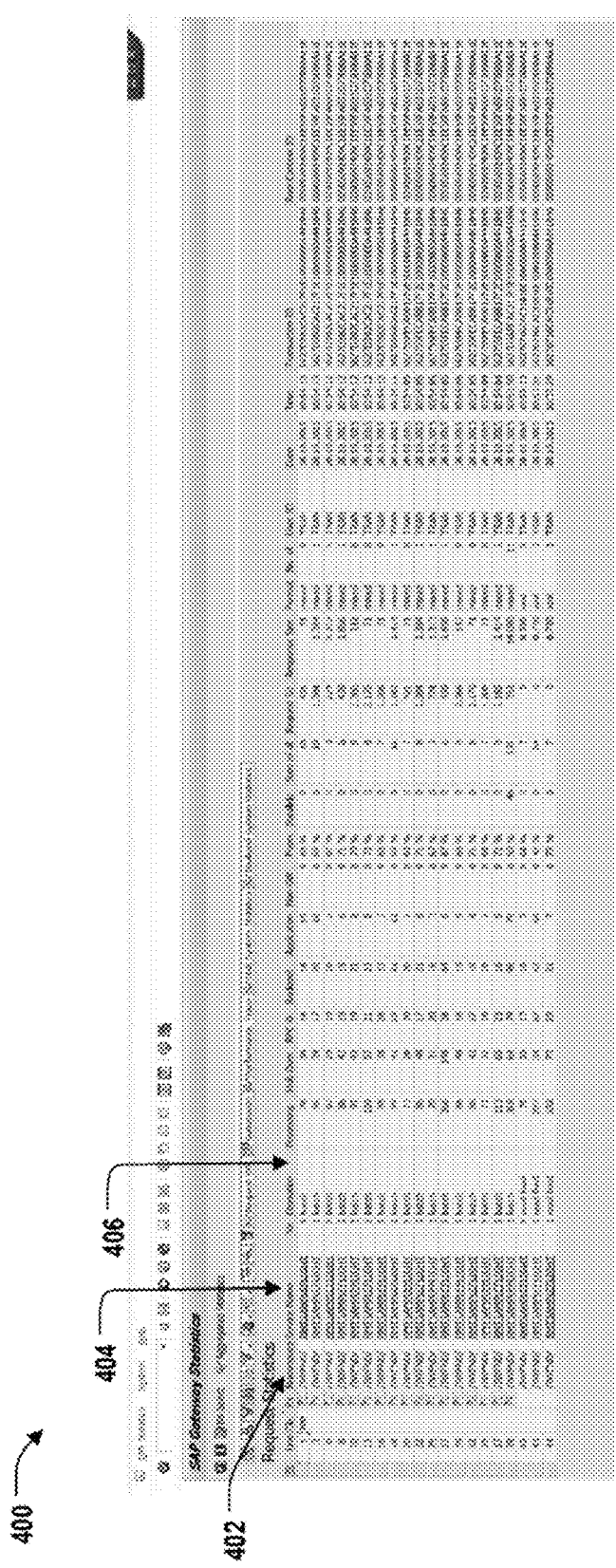
Figure 5:
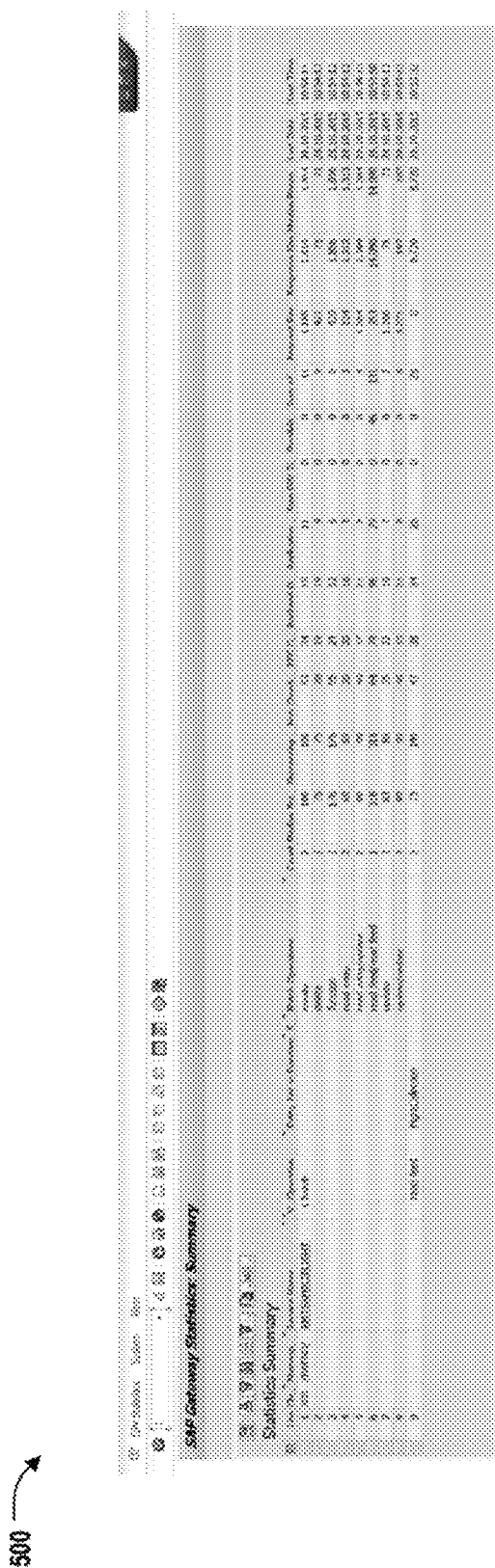
Figure 6:
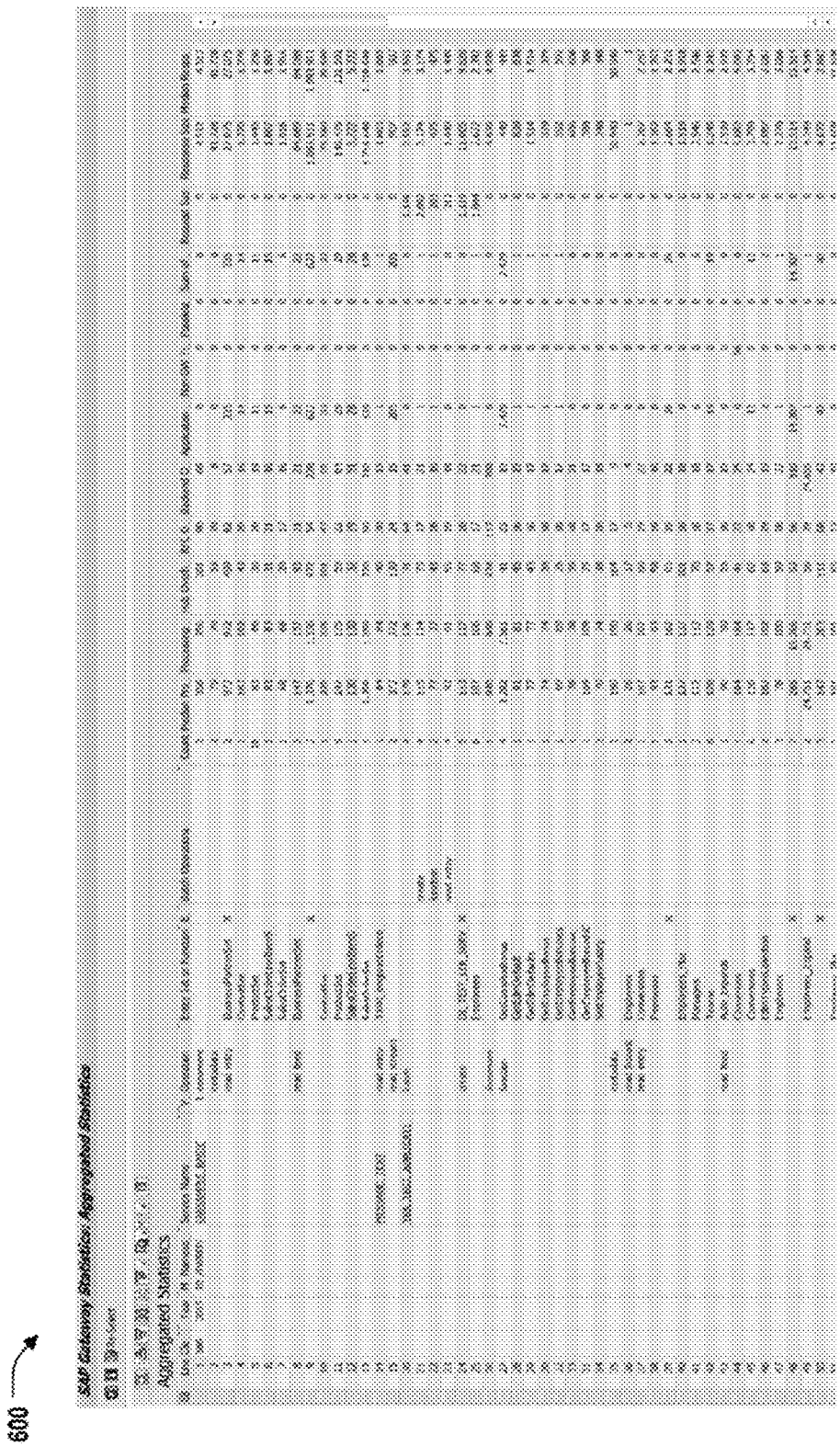

FIGS. 4-6 illustrates example graphical user interface (GUI) 400, 500, 600, respectively for display of the landscape and statistics service on a mobile communications device (e.g., a tablet computing device), according to an implementation. The landscape and statistics service facilitates identification of an OData request type (read or modify; batch or not) and duration of involvement of components during the OData processing.

To that end, GUI 400, as shown in FIG. 4, provides display of single request statistics. Specifically, the GUI 400 provides the single request statistics such as OData service name, request type, data format (e.g., xml, json, Microsoft Excel, or mixed for batch) and the durations of all involved components of the hub computing system 204 and/or the back-end computing systems 202. The GUI 400 includes a namespace column 402, a service name column 404, and an operation column 406. The name space column 402 and the service name column 404 describe the consumed OData service, and the operation column 406 describes the OData request type. The remaining columns of GUI further describe a duration of the OData processing of the components in the hub computing system 204 and the back-end computing systems 202 involved in the requested processing.

GUI 500, as shown in FIG. 5, provides display a summary of selected single request statistics. Specifically, the GUI 500 provides the summary based on the average times of an OData request of the same request type. GUI 600, as shown in FIG. 6, provides for display aggegrated statistics. Specifically, the GUI 600 provides aggegration of the single request statistics based on time periods (e.g., months, years).

Figure 7:
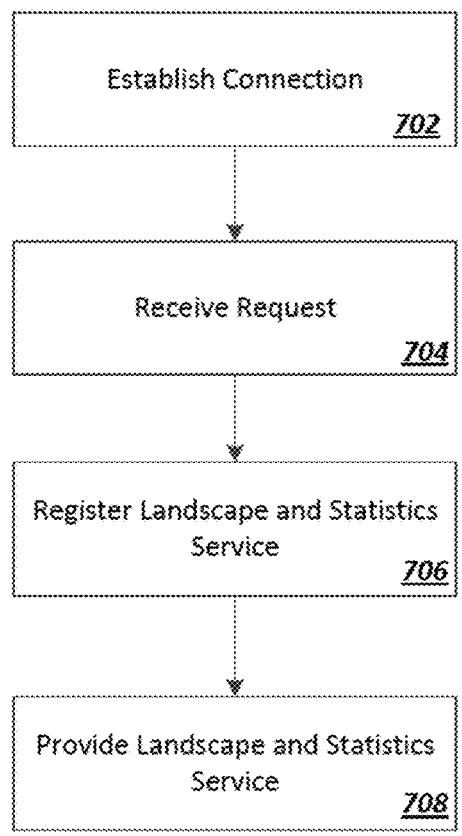
FIG. 7 illustrates a flow chart of a method for providing a landscape and statistics service, according to an implementation.

FIG. 7 is a flow chart that illustrates a method 700 for providing landscape and statistics service. For clarity of presentation, the description that follows generally describes method 700 in the context of FIGS. 1 and 2. For example, as illustrated, particular steps of the method 700 may be performed on or at an enterprise system, cloud-based system, and/or on-demand system, while other particular steps may be performed on or at a client system or on-premise system. However, method 700 may be performed, for example, by any other suitable system, environment, software, and hardware, or a combination of systems, environments, software, and hardware as appropriate.

At step 702, a hub computing system establishes a connection with a back-end computing system. At step 704, at the hub computing system and from an OData application that resides on a mobile communications device, a request is received for a landscape and statistics service providing information associated with the back-end computing system. In some examples, the OData application (e.g., the OData application 224) provides the request to the hub computing system (e.g., the hub computing system 204) utilizing one or more of the components of the hub computing system (e.g., the gateway framework module 212, the REST and OData library 214, and the HTTP framework module 216). In some examples, the aforementioned request is exclusive of identification of the back-end computing system (e.g., the back-end computing systems 202).

At step 706, the landscape and statistics service is registered on the hub computing system as an OData service that can be provided over an OData channel between the hub computing system and the mobile communications device. At step 708, the landscape and statistics service is provided by the hub computing system to the OData application as the OData service over the OData channel. In some examples, the OData service (e.g., the OData service 218) provides the information associated with the back-end computing system (e.g., the back-end computing systems 202) as stored by a database (e.g., the database 220).

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order (e.g., FIG. 7), this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure.

What is claimed is:

1. A computer-implemented method of providing an error log, comprising:

establishing, by a hub computing system, a communication connection between the hub computing system and a back-end computing system of two or more back-end computing systems, wherein the communication connection comprises use of a gateway framework module executing on the hub computing system and the back-end computing system, and wherein the hub computing system uses the gateway framework module executing on the hub computing system to issue remote function calls to the gateway framework module executing on the back-end computing system to exchange data regardless of programming languages executed by the hub computing system and the back-end computing system;

receiving, at the hub computing system and from an Open Data Protocol (OData) application that resides on a mobile communications device, a request for a landscape and statistics service providing information associated with the back-end computing system;

registering, on the hub computing system, the landscape and statistics service as an OData service configured to be provided over an OData channel between the hub computing system and the mobile communications device, wherein the registration includes converting a format of data of the landscape and statistics service to a format that the graphical user interface of the mobile communications device is able to utilize;

providing, by the hub computing system, the landscape and statistics service to the OData application as the OData service over the OData channel; and identifying an authorization of the OData application residing on the mobile communications device to receive the landscape and statistics service as the OData service, wherein information associated with the hub computing system and the back-end computing system, provided by the landscape and statistics service, includes release information associated with the hub computing system and the back-end computing system and statistics information associated with the hub computing system and the back-end computing system, the statistics information including single request statistics, a summary of selected single request statistics, aggregated statistics, and a time duration associated with each of the hub computing system and the back-end computing system with respect to the OData service.

2. The method of claim 1, further including storing the information associated with the back-end computing system in a database of the hub computing system.

3. The method of claim 1, wherein the communication connection is established between the hub computing system and the two or more back-end computing systems, and wherein receiving the request further includes receiving a request for the landscape and statistics service providing information associated with the two or more back-end computing systems.

4. A computer program product encoded on a non-transitory storage medium, the product comprising computer-readable instructions for causing one or more processors to perform operations comprising:

establishing, by a hub computing system, a communication connection between the hub computing system and a back-end computing system of two or more back-end computing systems, wherein the communication connection comprises use of a gateway framework module executing on the hub computing system and the back-end computing system, and wherein the hub computing system uses the gateway framework module executing on the hub computing system to issue remote function calls to the gateway framework module executing on the back-end computing system to exchange data regardless of programming languages executed by the hub computing system and the back-end computing system;

receiving, at the hub computing system and from an Open Data Protocol (OData) application that resides on a mobile communications device, a request for a landscape and statistics service providing information associated with the back-end computing system;

registering, on the hub computing system, the landscape and statistics service as an OData service configured to be provided over an OData channel between the hub computing system and the mobile communications device, wherein the registration includes converting a format of data of the landscape and statistics service to a format that the graphical user interface of the mobile communications device is able to utilize;

providing, by the hub computing system, the landscape and statistics service to the OData application as the OData service over the OData channel; and identifying an authorization of the OData application residing on the mobile communications device to receive the landscape and statistics service as the OData service, wherein information associated with the hub computing system and the back-end computing system, provided by the landscape and statistics service, includes release information associated with the hub computing system and the back-end computing system and statistics information associated with the hub computing system and the back-end computing system, the statistics information including single request statistics, a summary of selected single request statistics, aggregated statistics, and a time duration associated with each of the hub computing system and the back-end computing system with respect to the OData service.

5. The computer program product of claim 4, further including storing the information associated with the back-end computing system in a database of the hub computing system.

6. The computer program product of claim 4, wherein the communication connection is established between the hub computing system and the two or more back-end computing systems, and wherein receiving the request further includes receiving a request for the landscape and statistics service providing information associated with the two or more back-end computing systems.

7. A system of one or more computers configured to perform operations comprising:

establishing, by a hub computing system, a communication connection between the hub computing system and a back-end computing system of two or more back-end computing systems, wherein the communication connection comprises use of a gateway framework module executing on the hub computing system and the back-end computing system, wherein the hub computing system uses the gateway framework module executing on the hub computing system to issue remote function calls to the gateway framework module executing on the back-end computing system to exchange data regardless of programming languages executed by the hub computing system and the back-end computing system, and wherein the gateway framework module is executed by one or more processors;

receiving, at the hub computing system and from an Open Data Protocol (OData) application that resides on a mobile communications device, a request for a landscape and statistics service providing information associated with the back-end computing system;

registering, on the hub computing system, the landscape and statistics service as an OData service configured to be provided over an OData channel between the hub computing system and the mobile communications device, wherein the registration includes converting a format of data of the landscape and statistics service to a format that the graphical user interface of the mobile communications device is able to utilize;

providing, by the hub computing system, the landscape and statistics service to the OData application as the OData service over the OData channel; and identifying an authorization of the OData application residing on the mobile communications device to receive the landscape and statistics service as the OData service, wherein information associated with the hub computing system and the back-end computing system, provided by the landscape and statistics service, includes release information associated with the hub computing system and the back-end computing system and statistics information associated with the hub competing system and the back-end computing system, the statistics information including single request statistics, a summary of selected single request statistics, aggregated statistics, and a time duration associated with each of the hub computing system and the back-end computing system with respect to the OData service.

8. The system of claim 7, wherein the operations further comprising storing the information associated with the back-end computing system in a database of the hub computing system.

9. The system of claim 7, wherein the communication connection is established between the hub computing system and the two or more back-end computing systems, and wherein receiving the request further includes receiving a request for the landscape and statistics service providing information associated with the two or more back-end computing systems.

* * * * *